(12) United States Patent
Saito et al.

(10) Patent No.: US 12,731,247 B2
(45) Date of Patent: Sep. 8, 2026

(54) DEBRIS DETERMINATION METHOD

(71) Applicant: SHIN-ETSU HANDOTAI CO., LTD., Tokyo (JP)

(72) Inventors: Tomohiro Saito, Takasaki (JP); Tatsuya Masuda, Takasaki (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 207 days.

(21) Appl. No.: 18/568,989

(22) PCT Filed: Jun. 16, 2022

(86) PCT No.: PCT/JP2022/024157
§ 371 (c)(1),
(2) Date: Dec. 11, 2023

(87) PCT Pub. No.: WO2023/286519
PCT Pub. Date: Jan. 19, 2023

(65) Prior Publication Data

US 2024/0281960 A1 Aug. 22, 2024

(30) Foreign Application Priority Data

Jul. 13, 2021 (JP) ................................ 2021-115739

(51) Int. Cl.
*G06T 7/00* (2017.01)
*G01N 21/88* (2006.01)
(Continued)

(52) U.S. Cl.
CPC ......... *G06T 7/001* (2013.01); *G01N 21/8851* (2013.01); *G01N 21/9501* (2013.01);
(Continued)

(58) Field of Classification Search
CPC . G06T 7/001; G06T 7/11; G06T 7/136; G06T 7/62; G06T 2207/30148;
(Continued)

(56) References Cited

U.S. PATENT DOCUMENTS

2003/0003608 A1 1/2003 Arikado et al.
2003/0015806 A1 1/2003 Chiba et al.
(Continued)

FOREIGN PATENT DOCUMENTS

CN 110132991 A 8/2019
JP H02-275343 A 11/1990
(Continued)

OTHER PUBLICATIONS

Jul. 30, 2024 Office Action issued in Japanese Patent Application No. 2022-097355.

(Continued)

*Primary Examiner* — Kathleen Y Dulaney
(74) *Attorney, Agent, or Firm* — Oliff PLC

(57) ABSTRACT

A debris determination method of determining, using an image obtained by an appearance inspection device, debris that occurs around a hard laser mark (HLM) on a backside of a wafer, including: a step of calculating reference luminance from a grayscale image obtained by the appearance inspection device; a step of extracting a printed region including the HLM from the grayscale image; a step of excluding a dot portion of the HLM from the printed region; a step of extracting, with reference to the reference luminance, a debris region from the printed region from which the dot portion of the HLM has been excluded; and a step of determining the presence or absence of debris in the printed region based on the debris region. This provides a debris determination method that can reliably detect debris that (Continued)

cannot be detected by shape measuring devices and determine the presence or absence of debris.

17 Claims, 9 Drawing Sheets

(51) Int. Cl.

*G01N 21/95* (2006.01)
*G06T 7/11* (2017.01)
*G06T 7/136* (2017.01)
*G06T 7/62* (2017.01)

(52) U.S. Cl.

CPC ................ *G06T 7/11* (2017.01); *G06T 7/136* (2017.01); *G06T 7/62* (2017.01); *G01N 2021/8864* (2013.01); *G01N 2021/8887* (2013.01); *G06T 2207/30148* (2013.01); *G06T 2207/30204* (2013.01)

(58) Field of Classification Search

CPC ........ G06T 2207/30204; G06T 7/0004; G01N 21/8851; G01N 21/9501; G01N 2021/8864; G01N 2021/8887; G01N 21/956; H01L 22/12

USPC ......................................... 382/149, 145, 181

See application file for complete search history.

(56) References Cited

U.S. PATENT DOCUMENTS

2005/0190959 A1* 9/2005 Kohler .................... H05K 3/42 382/147
2006/0018534 A1* 1/2006 Nagata .................... G06T 7/001 382/164
2007/0036420 A1* 2/2007 Enachescu ............. G06T 7/001 382/141
2007/0197050 A1* 8/2007 Shirley ............... H10P 72/0448 438/800
2011/0280470 A1 11/2011 Hayashi
2013/0236083 A1* 9/2013 Wang ...................... G06T 7/001 382/144
2018/0328859 A1 11/2018 Osada et al.
2020/0025692 A1* 1/2020 Hisano ............... G01N 21/9503
2022/0342316 A1* 10/2022 Kooiman ................ G06T 7/001

FOREIGN PATENT DOCUMENTS

JP 2002-365236 A 12/2002
JP 2007-150174 A 6/2007
JP 2008-085252 A 4/2008
JP 2017-053764 A 3/2017
JP 2020-187696 A 11/2020
KR 20000057827 A 9/2000
KR 20020075282 A 10/2002

OTHER PUBLICATIONS

Aug. 2, 2022 International Search Report issued in International Patent Application No. PCT/JP2022/024157.
Jan. 16, 2024 International Preliminary Report on Patentability issued in International Patent Application No. PCT/JP2022/024157.
Nov. 13, 2025 Office Action issued in Korean Patent Application No. 2023-7044885.
May 21, 2026 Office Action issued in Chinese Patent Application No. 202280043984.4.

* cited by examiner

[FIG. 1]
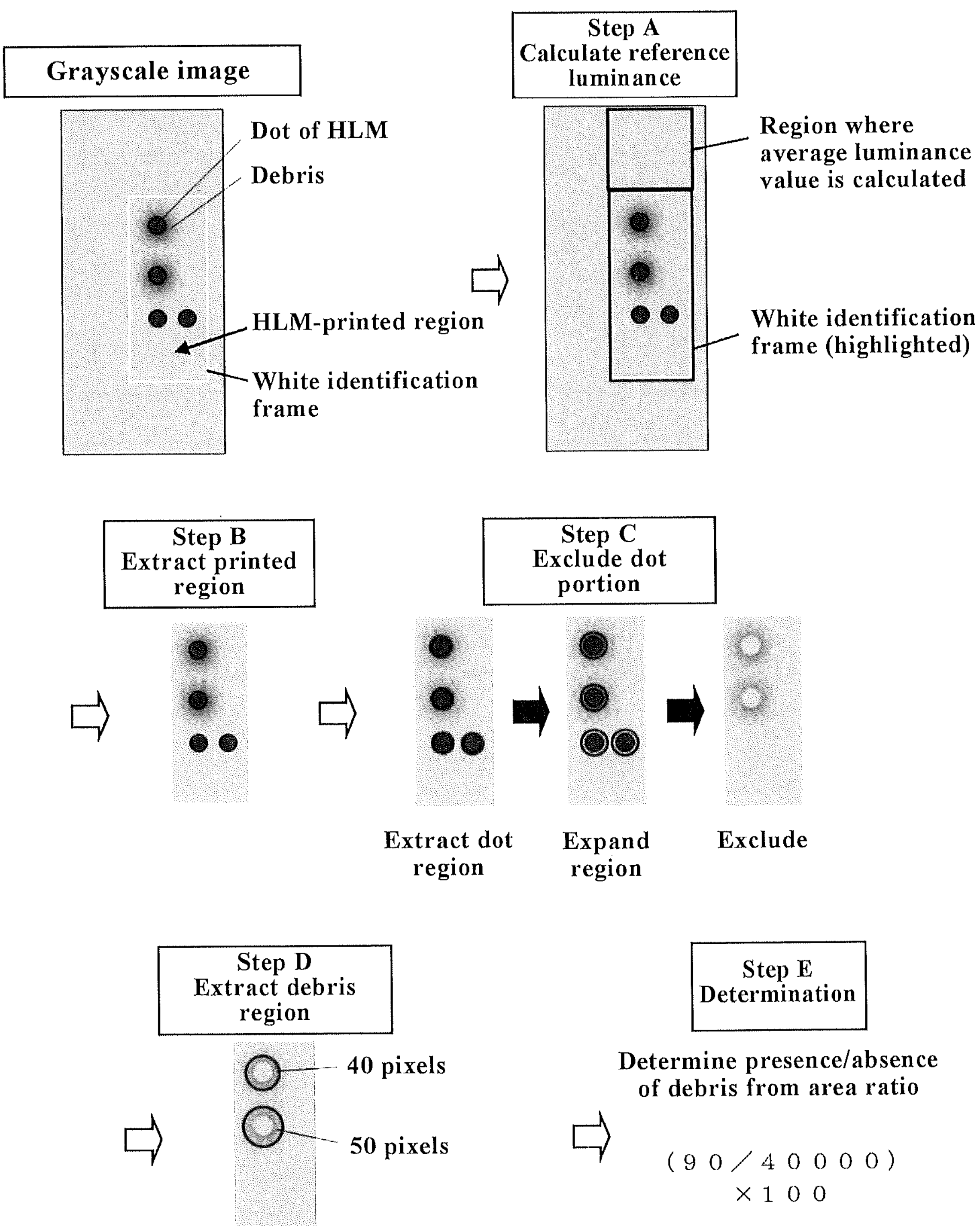

[FIG. 2]
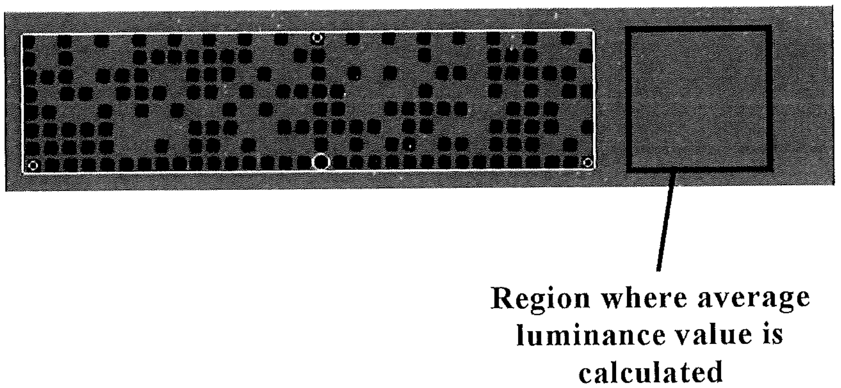
[FIG. 3]
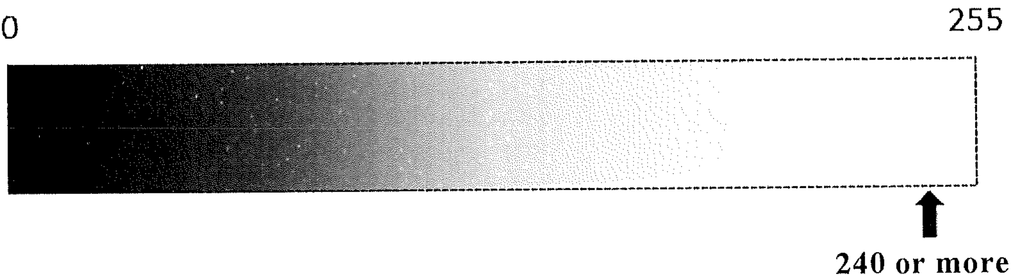
[FIG. 4]
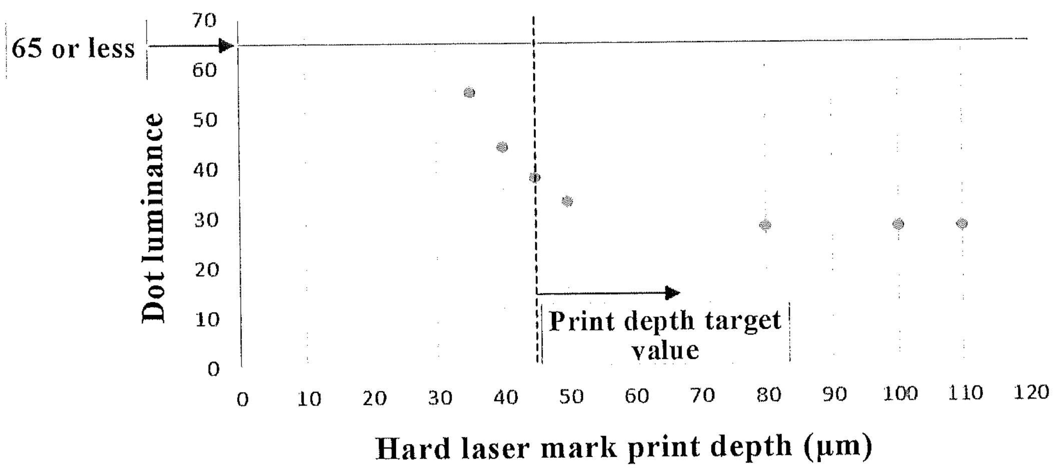

[FIG. 5]
Luminance transition along this line
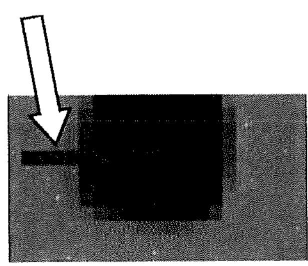
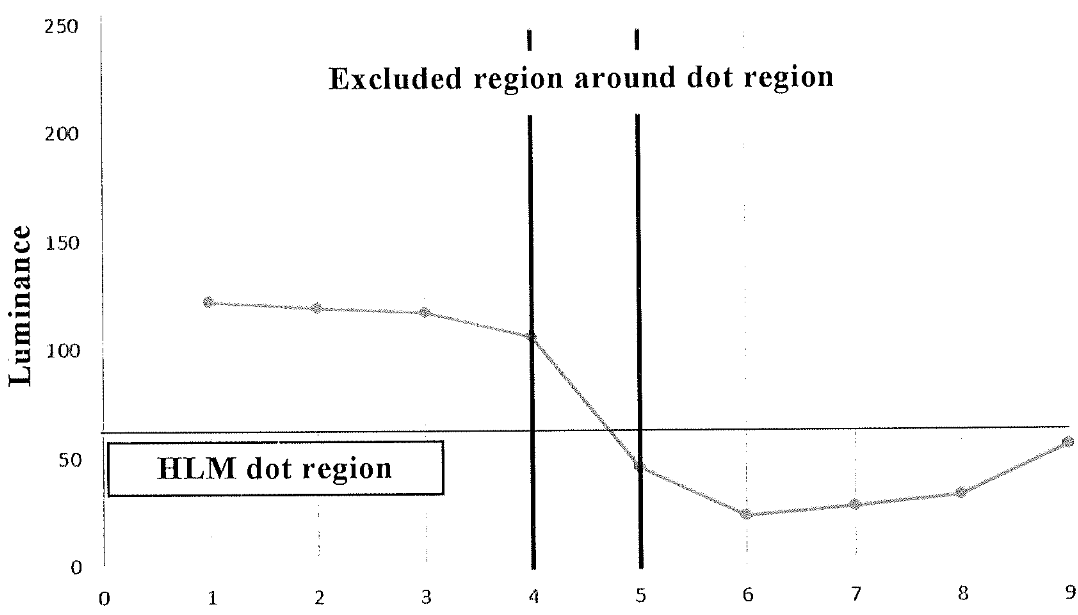

[FIG. 6]
Luminance transition along this line
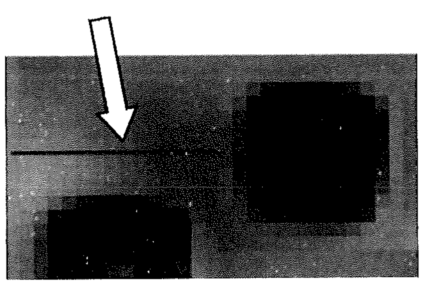
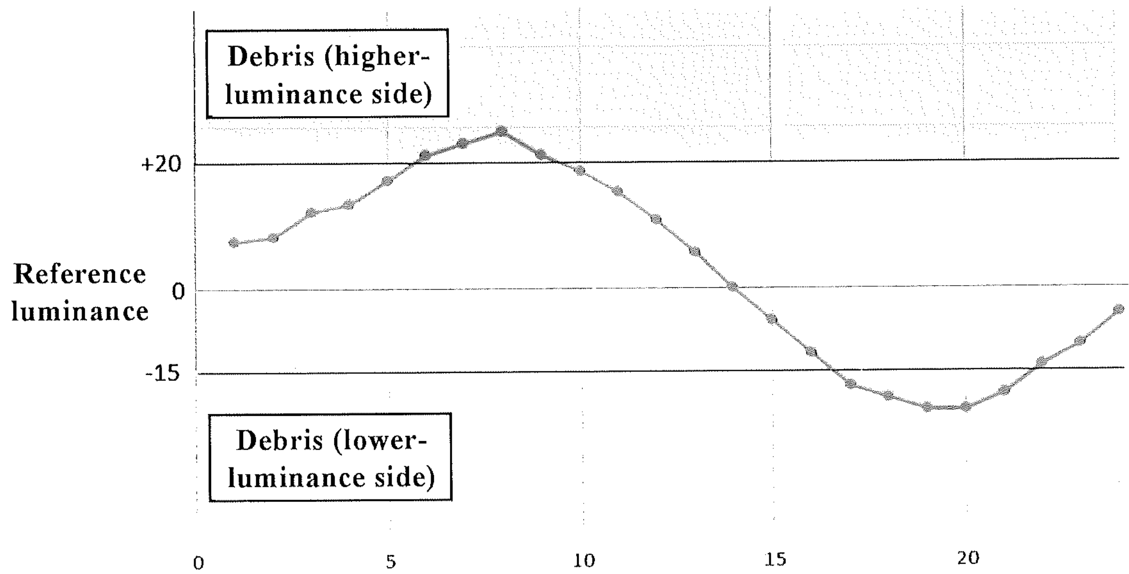

[FIG. 7]
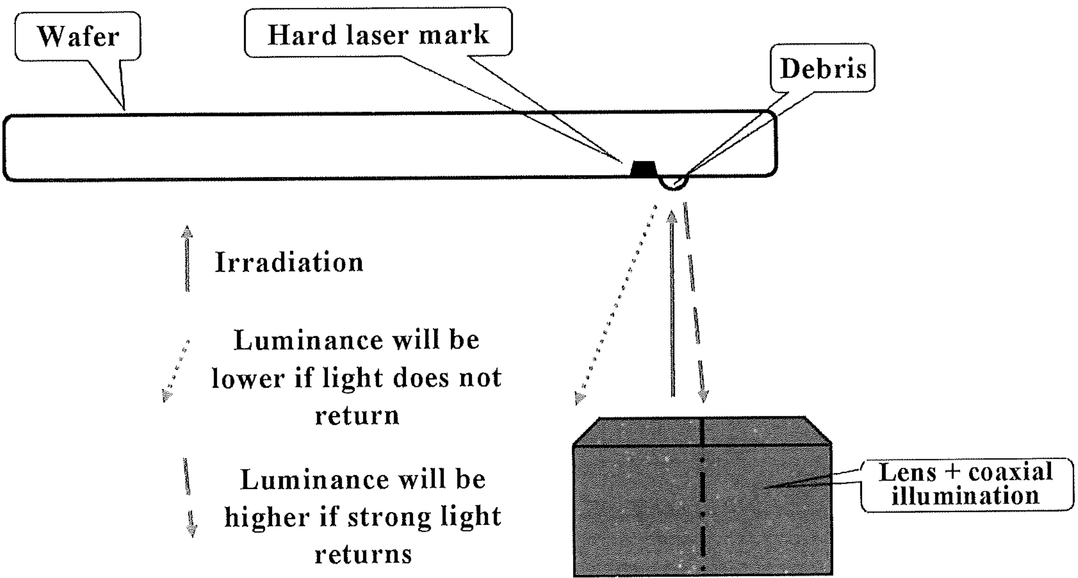
[FIG. 8]
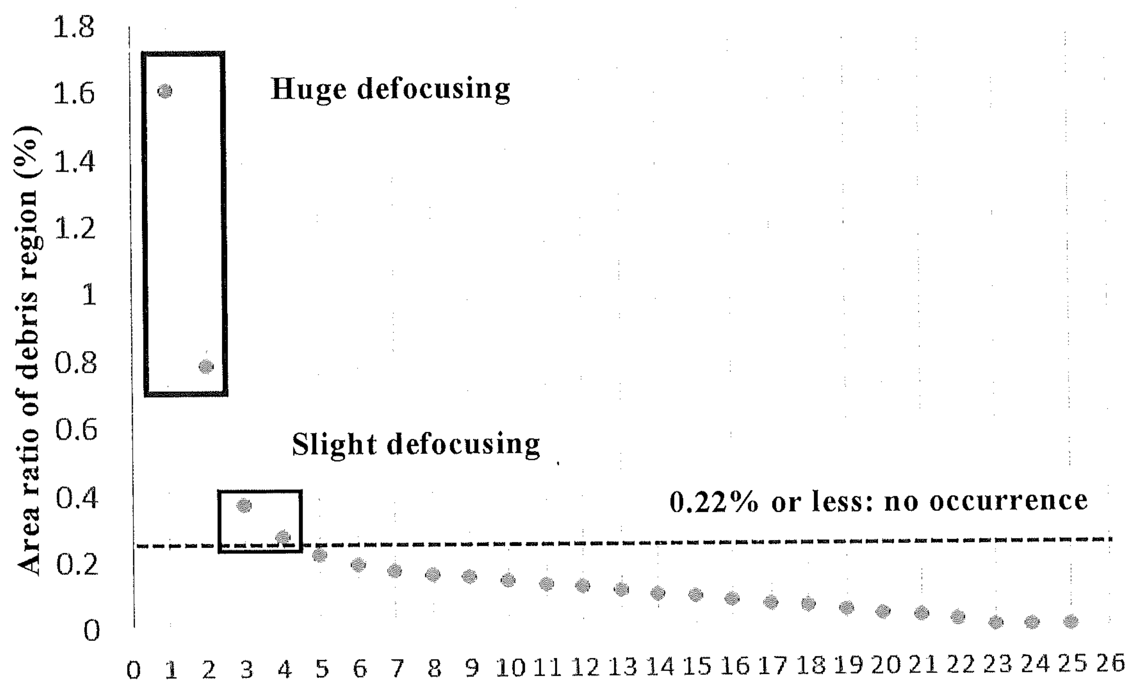

[FIG. 9]
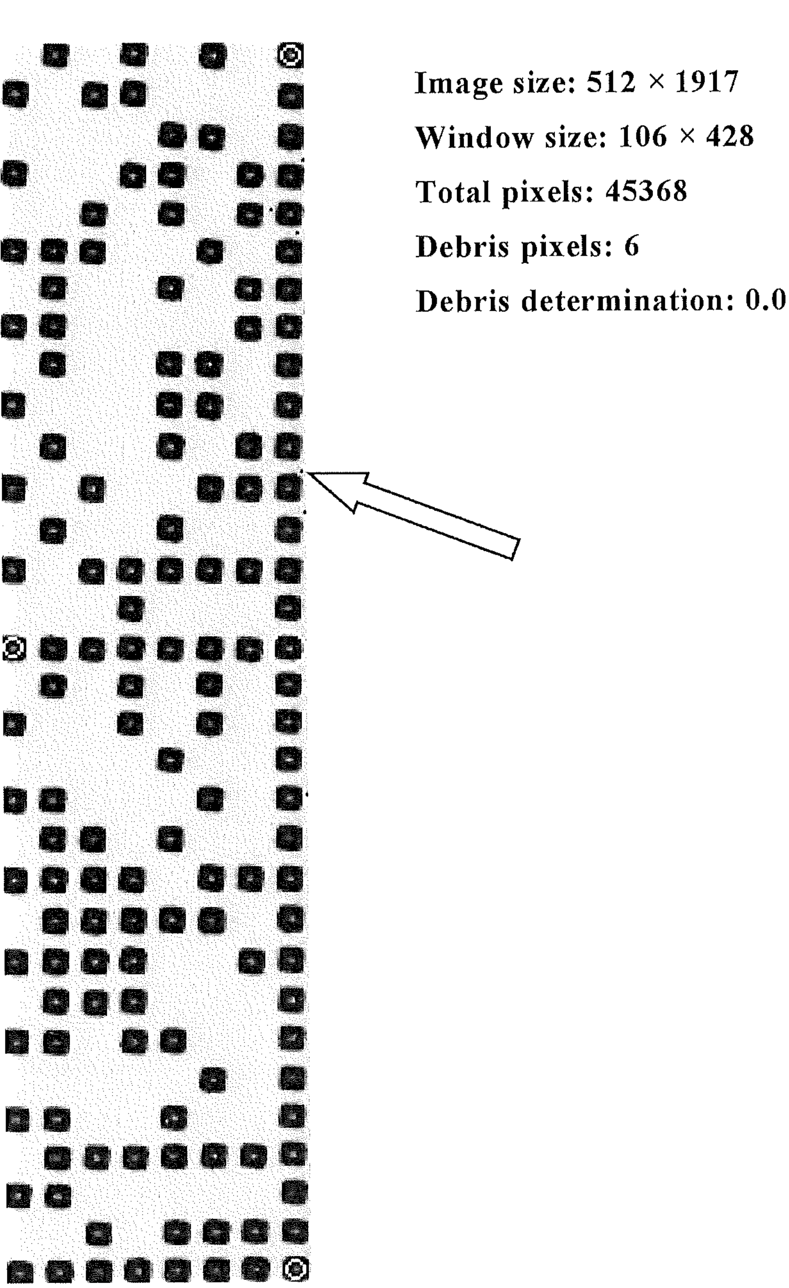

[FIG. 10]
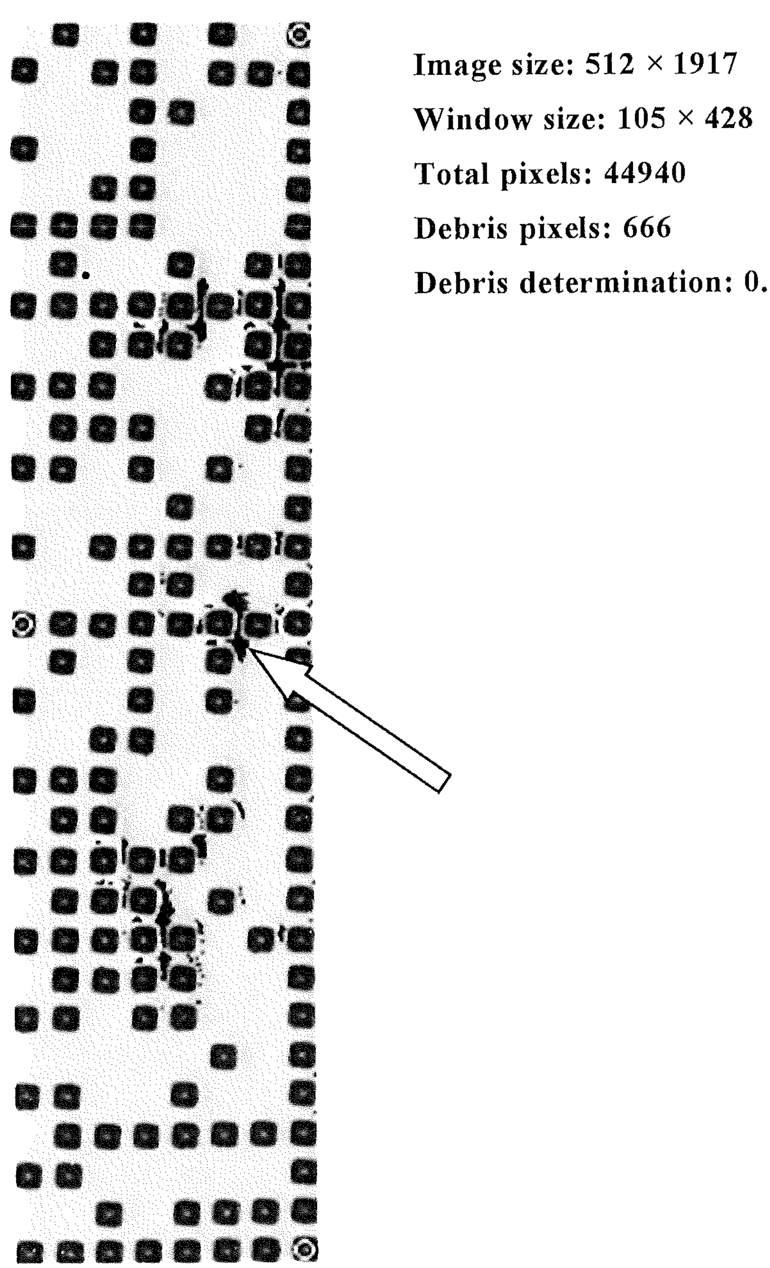
Image size: 512 × 1917
Window size: 105 × 428
Total pixels: 44940
Debris pixels: 666
Debris determination: 0.015 (NG)

[FIG. 11]
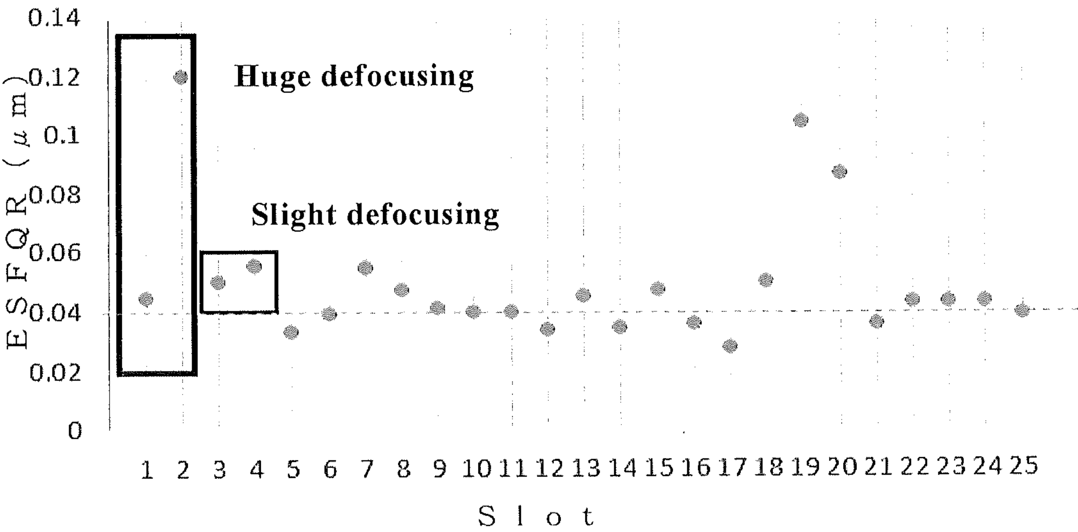
[FIG. 12]
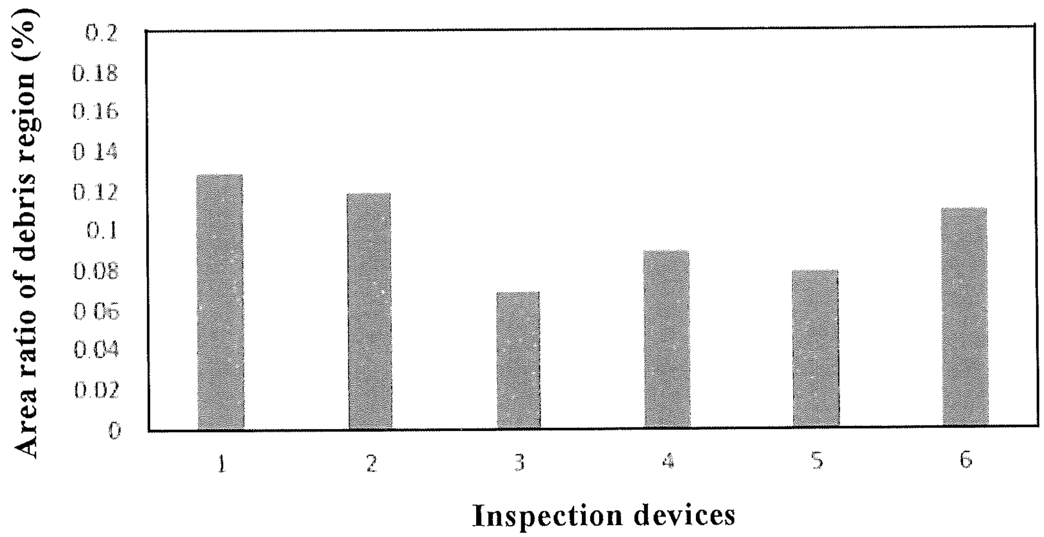

[FIG. 13]
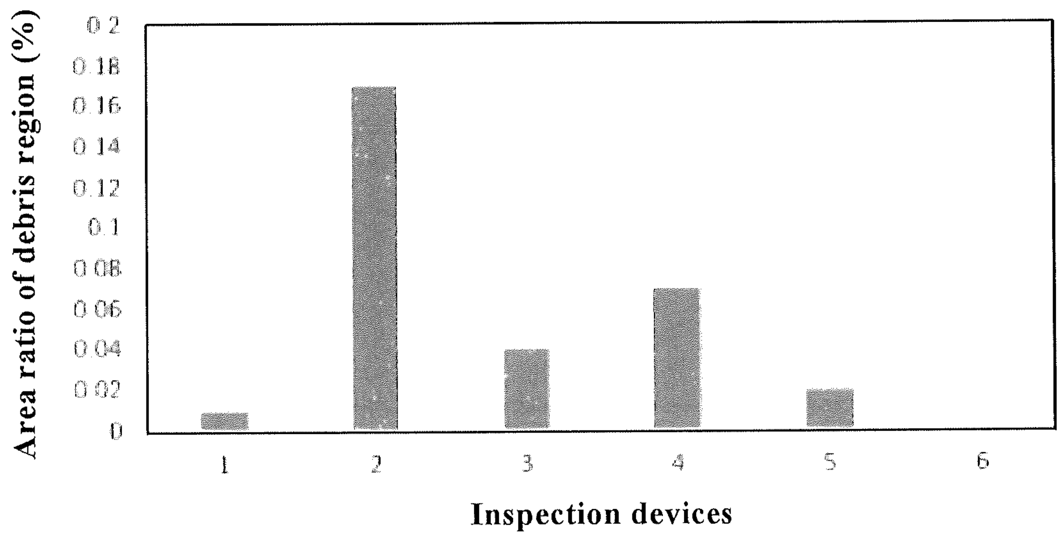
[FIG. 14]
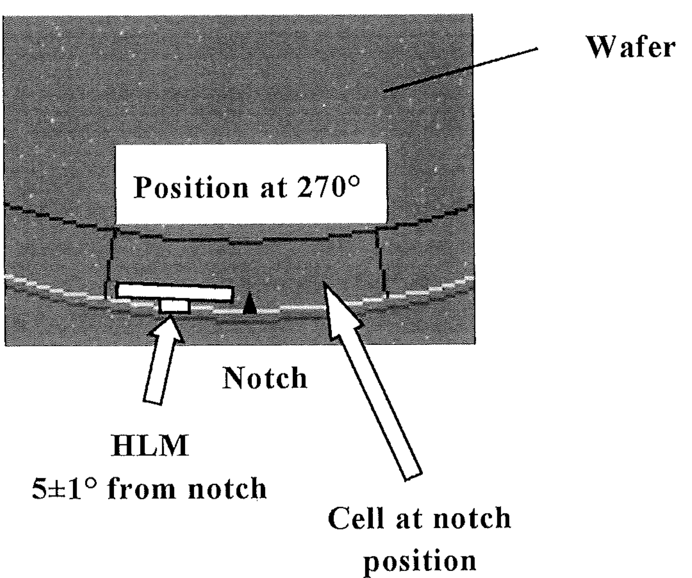

DEBRIS DETERMINATION METHOD

TECHNICAL FIELD

This present invention relates to a method of determining debris that occurs around a hard laser mark on a backside of a wafer using an image obtained by an appearance inspection device.

BACKGROUND ART

In order to identify individual silicon wafers, there is a process of printing an individual number in a flat portion on an edge of a backside of a wafer using solid-state laser (hard laser marking process). A hard laser mark is imprinted as characters by forming dots in an intermittent manner while melting the wafer itself with the high-power solid-state laser, so that silicon around the dot portion becomes amorphous, and the amorphous portion cannot be polished at the same polishing rate as the other monocrystalline portions during a subsequent polishing process. For this reason, a relatively gently-sloping bump is believed to be formed locally in the amorphous portion around the dots. This is called debris, and it has been noted that any interference of the debris with a stage for a device process will adversely affect device manufacturing. It is thus necessary to detect debris occurring in the laser mark portion.

In one conventional approach, shape measuring devices are used to identify debris in the hard laser mark portion as a shape abnormality due to thickness change. However, there have been cases where debris that cannot be detected by shape measuring devices poses a problem during the device manufacturing process. It is thus necessary to reliably detect such debris that cannot be detected by shape measuring devices.

As a conventional technique, a method of detecting surface irregularities or surface defects by image processing is disclosed.

For example, Patent Document 1 illustrates an example of image processing of a spherical concave recess and a spherical convex protrusion, and discloses that in a REV mode (reverse position defocusing), a protruded shape is brightly imaged (a recessed shape is darkly imaged) and in a FOW mode (forward position defocusing), a recessed shape is brightly imaged (a protruded shape is darkly imaged).

This technique is intended to detect depression-like defects caused by machining or crystallization, and is not intended to detect gentle bumps (debris).

When this method is used in an attempt to detect surface irregularities in the hard laser mark-printed region, only irregularities of the printed portion of the hard laser mark will be detected, and it will be impossible to detect gentle bumps (debris).

Patent Document 2 discloses a defect inspection method of photographing a surface of a to-be-inspected object with a differential interference microscope and counting the number of defects observed on the surface by image processing, where the defects are detected based on points whose luminance changes in the photographed image.

However, this technique is to measure the number of defects on the front surface, and cannot detect gentle bumps (debris) in the hard laser mark-printed region on the backside.

CITATION LIST

Patent Literature

Patent Document 1: JP 2017-053764 A
Patent Document 2: JP 2002-365236 A

SUMMARY OF INVENTION

Technical Problem

As described above, in one conventional approach, shape measuring devices are used to identify debris in the hard laser mark portion as a shape abnormality due to thickness change. However, there have been cases where debris that cannot be detected by shape measuring devices poses a problem during the device manufacturing process.

Hence, it is an object of the present invention to provide a debris determination method that can reliably detect such debris that cannot be detected by shape measuring devices and determine the presence or absence of debris.

Solution to Problem

To achieve the above object, the present invention provides a debris determination method of determining, using an image obtained by an appearance inspection device, debris that occurs around a hard laser mark on a backside of a wafer after the hard laser mark is formed on the backside or after the backside is polished after formation of the hard laser mark, comprising:

- a step A of calculating reference luminance from a grayscale image obtained by the appearance inspection device;
- a step B of extracting a hard laser mark-printed region including the hard laser mark from the grayscale image;
- a step C of excluding a dot portion of the hard laser mark from the extracted hard laser mark-printed region;
- a step D of extracting, with reference to the reference luminance, a region of the debris from the hard laser mark-printed region from which the dot portion of the hard laser mark has been excluded; and
- a step E of determining presence or absence of the debris in the hard laser mark-printed region based on the extracted region of the debris.

Such an inventive debris determination method can reliably extract only the debris region that cannot be detected by shape measuring devices, allowing for a more reliable determination of the presence or absence of debris than conventional methods.

Additionally, since the extraction of the debris region is performed based on the reference luminance, detection variations due to individual variations (device-to-device differences) between appearance inspection devices can be reduced.

In the step A, an average value of luminance of a portion in the grayscale image where the hard laser mark is not imprinted may be calculated as the reference luminance.

In this manner, the reference luminance can be unaffected by the luminance of the hard laser mark-printed region, which can increase the accuracy of the threshold of the pixel luminance for extracting the debris region based on the reference luminance.

In the step B, a threshold (identification frame) of pixel luminance may be set in advance that enables detection of a white identification frame appearing to surround the hard laser mark-printed region in the grayscale image, a region at or above the threshold (identification frame) may be determined and detected as the white identification frame, and a region surrounded by the detected white identification frame may be extracted as the hard laser mark-printed region.

Since the white identification frame surrounding the hard laser mark-printed region (an automatic function of the appearance inspection device) has a higher pixel luminance than other regions, a pixel luminance value for extracting only the white identification frame from the difference in pixel luminance value between the white identification frame and other regions can be set as the threshold (identification frame).

By extracting only the white identification frame in this manner, the hard laser mark-printed region inside the frame can be extracted, so that only the hard laser mark-printed region where debris occurs can be easily targeted for image processing.

In the step C, from a relationship between a dot region that constitutes the hard laser mark and pixel luminance of the dot region, a threshold (dot region) of pixel luminance may be set in advance that enables extraction of only the dot region, a region with pixel luminance at or below the threshold (dot region) may be determined and extracted as the dot region, and a region expanded by one or more pixels around a periphery of the extracted dot region may be excluded as the dot portion.

Since the dot portion (the region that is expanded by one or more pixels around the periphery of the dot region) will never be a debris region, it needs to be removed from the hard laser mark-printed region (i.e., the image processing region).

First, since the pixel luminance of the dot region constituting the hard laser mark has a particularly low value, the dot region can be easily identified from its pixel luminance value. At this time, the region to be removed as the dot portion is not only the dot region but extended to a region that is expanded by one or more pixels around the periphery of the dot region. This can prevent the portion around the dot from being incorrectly detected as debris due to change in pixel luminance that results from the influence of the dot portion.

In the step D, a relationship between debris with higher luminance than the reference luminance and pixel luminance of the higher-luminance debris and a relationship between debris with lower luminance than the reference luminance and pixel luminance of the lower-luminance debris may be obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance may be set in advance, and a region with pixel luminance at or above the threshold (higher-luminance debris) and a region with pixel luminance at or below the threshold (lower-luminance debris) may be determined and extracted as the region of debris.

By extracting the debris region based on the reference luminance in this manner, detection variations due to individual variations between appearance inspection devices can be more reliably prevented.

In the step E, a relationship between an area ratio of the region of debris in the hard laser mark-printed region and quality defects caused by debris in a device manufacturing process may be obtained in advance, and a threshold (presence of debris) of an area ratio of debris at which the quality defects caused by debris occur may be set in advance, an area ratio of the region of debris in the hard laser mark-printed region may be obtained from a number of pixels in the extracted region of debris, and when the area ratio of the region of debris is at or above the threshold (presence of debris), it may be determined that debris is present.

In this manner, a quantitative evaluation is possible by obtaining the area ratio of debris.

Further, when quality characteristic defects caused by debris in the device manufacturing process are known, making a determination in the above manner can be an extremely accurate and effective debris determination method.

The present invention also provides a wafer having a hard laser mark on a backside thereof, comprising the hard laser mark-printed region that is determined to be free of the debris by the inventive debris determination method described above.

Such an inventive wafer is a qualified one that has been determined to be free of the debris that cannot be detected by shape measuring devices, so that it can be a good product that can reduce occurrence of problems caused by debris when it is later subjected to the device manufacturing process.

Advantageous Effects of Invention

The inventive debris determination method can reliably detect debris that cannot be detected by shape measuring devices and determine the presence or absence thereof. The method can further reduce inspection variations between appearance inspection devices.

BRIEF DESCRIPTION OF DRAWINGS

FIG. 1 is a flowchart showing an example of the inventive debris determination method;

FIG. 2 is a measurement diagram showing an example of a grayscale image from an appearance inspection device;

FIG. 3 is an explanatory diagram showing changes in luminance from 0 to 255 in grayscale;

FIG. 4 is a graph showing a relationship between the hard laser mark print depth and luminance;

FIG. 5 is a graph showing an example of an image portion near a dot region and changes in luminance of the image portion;

FIG. 6 is a graph showing a part of the hard laser mark-printed region and changes in luminance when the part is scanned;

FIG. 7 is an explanatory diagram showing what happens when debris is irradiated with light by an appearance inspection device;

FIG. 8 is a graph showing an example of relationship between an area ratio of the debris region and the occurrence of defocusing in a device manufacturing process;

FIG. 9 shows an image of a printed region with a 0% area ratio of the debris region in Example 1 (determination of the absence of debris);

FIG. 10 shows an image of a printed region with a 1.5% area ratio of the debris region in Example 1 (determination of the presence of debris);

FIG. 11 is a graph showing an example of relationship between an ESFQR and the occurrence of defocusing in a device manufacturing process;

FIG. 12 is a graph showing device-to-device differences in the area ratio of the debris region in Example 2;

FIG. 13 is a graph showing device-to-device differences in the area ratio of the debris region in Comparative Example 2; and FIG. 14 is an explanatory diagram showing a cell containing the hard laser mark at the notch position.

DESCRIPTION OF EMBODIMENTS

Hereinafter, embodiments of the present invention will be described with reference to the drawings. However, the present invention is not limited to the following description.

For the sake of brevity, the hard laser mark may be referred to hereinafter as an HLM, and the hard laser mark-printed region may be referred to hereinafter as a printed region.

The present invention is a method of determining debris occurring around an HLM on a backside of a wafer that has been formed with the HLM as an individual number or that has been further polished afterwards, using an image (grayscale image) obtained by an appearance inspection device. For example, any conventional, commercially available appearance inspection device can be used. One example is SIFTer300. In particular, it is preferable to use an appearance inspection device that has a function to automatically enclose a region including the HLM (printed region) with a white identification frame and leave it as an image.

FIG. 1 shows an example of the inventive debris determination method. The method is roughly divided into the following steps: a step A: calculating reference luminance; a step B: extracting a printed region; a step C: excluding a dot portion; a step D: extracting a debris region; and a step E: determination. Explanatory diagrams for the respective steps are also shown.

The steps will be detailed below.

<Step A: Calculating Reference Luminance>

This step is to calculate reference luminance from a grayscale image obtained by an appearance inspection device.

Located at the upper left corner of FIG. 1 is a grayscale image from the appearance inspection device, which shows an HLM and a white identification frame identifying the position of the HLM.

An example of an actual grayscale image is also shown in FIG. 2. This image is a hard laser mark-printed position inspection image B_T7 (BMP format) in 8-bit grayscale (256 gradations) obtained from an appearance inspection device.

An average luminance value of a portion in the grayscale image (256 gradations) where the HLM is not imprinted is calculated as reference luminance.

Differences in luminance occur even with use of the same wafer due to device-to-device differences between appearance inspection devices. Thus, for each wafer to be measured, the average luminance value of the portion where the HLM is not imprinted is calculated to improve the accuracy of debris detection.

The region in which to calculate the average luminance value is not particularly limited, but for example, the portion where the HLM is not imprinted can be at a position that is on the same circumference as the white identification frame identifying the position of the HLM and at 10 pixels away from the right edge of the identification frame. More specifically, the average luminance value of each wafer can be calculated in a square region with one side having a length of the short side of the identification frame (or printed region).

<Step B: Extracting Printed Region>

This step is to extract the printed region including the HLM from the grayscale image.

First, in order to extract only the printed region, a threshold (identification frame) of pixel luminance is set in advance that enables detection of the white identification frame in the grayscale images (256 gradations). For example, the identification frame is identified and detected from pixels with "pixel luminance≥240."

Since this identification frame is shown in white (in the example shown in FIG. 1, the frame is shown in white as is in the grayscale image, while the frame is highlighted in the drawing depicting the step A for clarity), the threshold does not change depending on different wafers or devices. The changes in luminance from 0 to 255 in grayscale is shown in FIG. 3. The luminance of the white identification frame is 255 in the grayscale image (256 gradations), and in order to reliably detect the identification frame, the threshold (identification frame) is set at 240, for example, as described above. The white square identification frame is detected by processing on the grayscale image from left to right, and the region surrounded by the frame is extracted as the hard laser mark-printed region.

Note that the upper limit of the pixel luminance in the "region at or above the threshold (identification frame)" that is determined to be the white identification frame can be 255 due to the grayscale nature.

In this manner, the printed region in which debris occurs can be easily extracted.

Note that this approach is of course not limiting, and even if the appearance inspection device does not have the automatic function for the white identification frame, it is also possible, for example, for an operator to manually trim the region including the HLM in the grayscale image to extract the printed region.

<Step C: Excluding Dot Portion>

This step is to exclude the dot portion of the HLM from the extracted printed region.

First, the terminology used herein is briefly described. A region that constitutes the printed HLM itself is referred to as a dot region. A region that is extended to a region expanded by one or more pixels (e.g., 1 to 5 pixels) around the periphery of the dot region is referred to as a dot portion.

From a relationship between the dot region and its pixel luminance, a threshold (dot region) of pixel luminance is set in advance that enables extraction of only the dot region. This is to determine a region with pixel luminance at or below this threshold (dot region) as the dot region and extract it.

For example, FIG. 4 is a graph showing a relationship between the HLM print depth and luminance when HLMs of different depths are printed on a 300-mm diameter wafer.

While a target value for typical HLM print depth is 45 μm±5 μm, the luminance at the print depth of 35 μm to 110 μm is shown here in consideration of variations in required specifications. In this case, setting the threshold (dot region)

of pixel luminance to 65 or less can reliably exclude the dot region of the HLM from a target where debris is to be detected.

Note that the lower limit of the pixel luminance in the "region at or below the threshold (dot region)" that is determined to be the dot region can be 0 due to the grayscale nature.

The peripheral portion of the dot region (the excluded region around the dot region) has a reduced pixel luminance, as shown in FIG. 5. FIG. 5 is a graph showing an image portion near the dot region and changes in luminance of the image portion. Since this luminance change may be incorrectly counted as debris, a region expanded by at least one pixel from the dot region is excluded to prevent such false detection. As described above, the number of pixels to expand can be variable from, e.g., 1 to 5 pixels, depending on the size of the image to be processed. Of course, expansion by more than 5 pixels is also possible when necessary, and the upper limit cannot be determined since it also depends on the size of the image, etc.

When the image (i.e., the printed region extracted in the step B) is actually processed, a region with pixel luminance at or below the threshold (dot region) is extracted as the dot region, and then the above dot portion obtained by expansion from the dot region is excluded.

This prevents false detection of debris.

<Step D: Extracting Debris Region>

This step is to extract, with reference to the reference luminance, a debris region from the printed region from which the dot portion of the HLM has been excluded.

Two relationships are obtained in advance, namely a relationship between debris with higher luminance than the reference luminance and its pixel luminance, and a relationship between debris with lower luminance than the reference luminance and its pixel luminance. Further, two thresholds are set from these relationships, namely a threshold (higher-luminance debris) of pixel luminance that enables extraction of the higher-luminance debris with reference to the reference luminance, and a threshold (lower-luminance debris) of pixel luminance that enables extraction of the lower-luminance debris with reference to the reference luminance. Then, from the actual image (i.e., the printed region from which the dot portion has been excluded in the step C), a region at or above the threshold (higher-luminance debris) and a region at or below the threshold (lower-luminance debris) are extracted as the debris region.

In the example shown in FIG. 1, the number of pixels counted as the debris region are 40 and 50, for a total of 90.

For example, the threshold (lower-luminance debris) can be "pixel luminance≤[reference luminance−15]," and the threshold (higher-luminance debris) can be "pixel luminance≥[reference luminance+20]."

Then, for the image of the printed region from which the dot portion has been excluded in the above manner, the printed region is scanned according to the above criteria to count the number of pixels at the location of debris occurrence (in the debris region). FIG. 6 shows an example of a part of the printed region and changes in luminance when the part is scanned. Areas above the threshold can be seen on both of the higher-luminance and lower-luminance sides relative to the reference luminance.

Note that the upper limit of the pixel luminance relative to the reference luminance in the "region at or above the threshold (higher-luminance debris)" extracted as the higher-luminance debris can be +255 due to the grayscale nature. Also, the lower limit of the pixel luminance relative to the reference luminance in the "region at or below the threshold (lower-luminance)" extracted as the lower-luminance debris can be −255 due to the grayscale nature.

The high-luminance debris and the lower-luminance debris will be described. FIG. 7 is an explanatory diagram showing what happens when debris is irradiated with light by an appearance inspection device. A relatively gently-sloping bump is formed at the debris. The appearance inspection device uses a lens and coaxial illumination to irradiate a wafer with light. If a gentle bump occurs and the light is scattered and does not return to the camera, the luminance will be lower, while if strong light returns, the luminance will be higher, so that higher- and lower-luminance is detected relative to the reference luminance.

In the present invention, for example, wafers that have been found problematic during the device manufacturing process can be used as samples to determine the thresholds for the higher- and lower-luminance sides as described above. In particular, it is preferable to determine the threshold (higher-luminance debris) and the threshold (lower-luminance debris) as appropriate by taking into account a correlation with the device process and device-to-device differences.

Since the extraction of the debris region is performed based on the reference luminance, it helps to prevent detection variations due to device-to-device differences between appearance inspection devices.

<Step E: Determination>

This step is to determine the presence or absence of debris in the printed region based on the extracted debris region.

First, a relationship between an area ratio of the debris region in the printed region and quality defects caused by debris in the device manufacturing process is obtained in advance. Further, from the relationship, a threshold (presence of debris) of an area ratio of debris at which quality defects caused by debris occur is set.

From the number of pixels of the debris region extracted in the step D from an actual wafer that is subject to determination, an area ratio of the debris region in the printed region is obtained. If the area ratio is at or above the above threshold (presence of debris), it is determined that debris (debris that causes quality defects) is present.

FIG. 8 shows an example of relationship between an area ratio of the debris region and the occurrence of defocusing in the device manufacturing process. For clarity, the sample levels (Slot) on the horizontal axis are sorted from high to low in terms of the area ratio of the debris region.

In this case, defocusing defects start to occur when the area ratio of the debris region is around 0.22% of the region to be processed (printed region). Thus, the threshold (presence of debris) can be set to 0.2%, and if the area ratio is at or above 0.2%, it can be determined that debris is present.

Accordingly, for the debris region actually extracted in the step D, an area ratio of the debris region is calculated from the ratio of [the number of pixels in the debris region]/[the number of pixels in the HLM-printed region], and an accurate determination of the presence or absence of debris can be made by determining whether the area ratio passes or fails the determination criterion of 0.2% of the region to be processed (printed region). In particular, it is possible to reliably screen wafers that will not have defocusing defects in the device manufacturing process.

In the example shown in FIG. 1, the number of pixels in the printed region is 40000 (400 in length×100 in width), and that in the debris region is 90, so that the area ratio is 2.25%. Accordingly, it is determined that debris is present as the threshold (presence of debris) of 0.2% is exceeded, and defocusing defects are expected to occur.

By the way, the upper limit of the area ratio of the debris region cannot be determined as it depends on the number of pixels in the debris region, but the maximum is 100% due to the above formula to calculate the area ratio of the debris region.

According to the present invention as described above, it is possible to reliably detect debris that cannot be detected by conventional inspection methods using shape measuring devices and accurately determine the presence or absence of debris. Additionally, the detection is possible with reduced detection variations caused by device-to-device differences between appearance inspection devices.

Additionally, since the qualified wafers with the printed region that has been determined to be free of debris by the inventive determination method have passed the accurate determination as described above, problems such as defocusing defects caused by debris can be prevented in the device manufacturing process.

EXAMPLE

The present invention will now be further detailed with reference to Examples and Comparative Examples, though the present invention is not limited to these examples.

Example 1

(25+2) wafers with a diameter of 300 mm and a crystal plane orientation of (110) were prepared. The imprinting location of the hard laser mark was at 5±1° from the notch on the backside of each wafer, and double side polishing was performed.

Of the total of 27 wafers, 25 wafers were used to investigate the relationship between the area ratio of the debris region and the occurrence of defocusing in the device manufacturing process, and with reference to the relationship, the other two wafers were subject to determination of the presence or absence of debris that would affect the occurrence of defocusing.

Debris was detected on these wafers by image processing on 8-bit grayscale (256 gradations), BPM format, images obtained by an appearance inspection device (SIFTer 300).

<Step A: Calculating Reference Luminance>

An average luminance value of each wafer was calculated in a square region, as a portion not imprinted with the hard laser mark, that was located on the same circumference as the printed region where the hard laser mark was printed (or the region surrounded by the white identification frame) and 10 pixels away from the right edge of the identification frame, with one side of the square region having a length of the short side of the identification frame.

The results showed a minimum value of 118 and a maximum value of 119 for the 25 samples.

<Step B: Extracting Printed Region>

As the extraction process for the hard laser mark-printed region, the position of the white identification frame was identified using the threshold (identification frame) of "pixel luminance≥240," and the hard laser mark-printed region was extracted over the pixel size of about 105×430 from the angle of 5° from the notch.

<Step C: Excluding Dot Portion>

Within the hard laser mark-printed region, the dot region of the hard laser mark was identified using the threshold (dot region) of "pixel luminance≤65," and a region (dot portion) expanded by one pixel from the periphery of the dot region was used as the region to be excluded.

Here, a specific image processing method to exclude this portion will be described.

Starting from the upper left pixel within the hard laser mark-printed region, scanning is performed by raster scanning. Upon detection of a pixel with "pixel luminance≤65," the pixel is recorded as the start coordinates for the dot region detection process. The surrounding eight pixels around the start coordinates are examined counterclockwise, and coordinates of the first pixel that satisfies "pixel luminance≤65" are recorded as a dot periphery and used as new start coordinates. The above process is repeated until returning to the initially set start coordinates. Since the dot periphery is expanded by one pixel, the coordinates of eight pixels around each recorded pixel are also recorded as the dot periphery. The interior of the dot periphery is recorded as the dot region.

The dot periphery and the dot region obtained in the above manner are excluded from the debris detection process.

<Step D: Extracting Debris Region>

A specific counting method for the number of pixels with the occurrence of debris is as follows.

Starting from the upper left pixel within the hard laser mark-printed region, scanning is performed by raster scanning.

When a pixel satisfies the threshold (lower-luminance debris) of "pixel luminance≤[reference luminance−15]" or the threshold (higher-luminance debris) of "pixel luminance≥[reference luminance+20]", that pixel is counted as a pixel with the occurrence of debris.

<Step E: Determination>

An area ratio of the debris region was obtained from the obtained number of pixels with the occurrence of debris, and its relationship with the occurrence of defocusing in the device manufacturing process was investigated, resulting in a graph that showed a similar relationship to that of FIG. 8. Regarding the area ratio of the debris region at which specific problems (defocusing) occur, 0.22% was recognized as the boundary of the defocusing occurrence, and 0.2% or more was defined as having debris. These are the results obtained from the 25 wafers for investigation.

Then, the two wafers for determination were subject to the determination according to the pass/fail criterion of 0.2% obtained from the graph of FIG. 8. One of the wafers passed as it had some, but little, debris and was determined to be free of debris with the area ratio of the debris region being about 0%. The other of the wafers failed as it was determined to have debris with the area ratio being about 1.5%. For the respective wafers, images of the hard laser mark-printed region with notifications of locations where debris occurred are shown (representative portions are indicated by arrows). FIG. 9 is the image with the area ratio of 0%, and FIG. 10 is the image with the area ratio of 1.5%.

Following the actual device manufacturing process, no defocusing defects occurred in the wafer with the 0% determination, while huge defocusing defects occurred in the wafer with the 1.5% determination.

Comparative Example 1

Results of shape measurement (ESFQR) of the hard laser mark-printed region using a commercially available shape measuring device (WaferSight, made by KLA-Tencor) were analyzed to see whether they could be separated based on the results of defocusing determination in the device process.

Similar wafers to the 25 wafers for investigation in Example 1 were prepared.

Note that the ESFQR refers to a calculated range of positive and negative deviations from an intra-region least squares method for a rectangular region (cell). A generally rectangular region to be measured is surrounded by 10 mm from the peripheral edge in the diameter direction and an arc that is equivalent to 18° in the circumferential direction, and a cell positioned at a wafer center angle of 270° (cell at the notch position) is the region containing the hard laser mark. FIG. 14 shows the cell containing the hard laser mark at the notch position.

FIG. 11 shows an example of relationship between the ESFQR and the occurrence of defocusing in the device manufacturing process. The sequence of the sample levels on the horizontal axis is the same as that in Example 1.

The rectangular region at 270° subjected to the shape measurement corresponds to the position of the hard laser mark formation. However, it can be seen that it is impossible to determine the presence or absence of defocusing defects caused by debris in the device process based on the ESFQR values.

In other words, attempts to classify problematic wafers based on the thickness shape variation values (ESFQR) as a conventional debris abnormality screening method had the following outcomes. While some wafers that had the problem of defocusing in the device process exhibited high values, other wafers did not exhibit high values despite having huge defocusing. Conversely, some wafers with no problems exhibited high values. After all, the ESFQR cannot be used to screen the presence or absence of debris.

Example 2, Comparative Example 2

One wafer of Slot-15 was selected from the same wafers as in Example 1 and subjected to a debris determination using six appearance inspection devices.

Inter-device differences (device-to-device differences) in debris determination were compared between the two cases, namely the case in which the calculation of the reference luminance of the step A was performed for each wafer by the six appearance inspection devices (Example 2), and the case in which the calculation of the reference luminance of the step A was not performed for each wafer by the six appearance inspection devices (in this case, the lower-luminance debris was extracted with "pixel luminance≤105," while the higher-luminance debris was extracted with "pixel luminance≥140") (Comparative Example 2). The respective results are shown in FIGS. 12 and 13.

In Example 2, as shown in FIG. 12, a minimum value of the area ratios of the debris region from the six devices was 0.07%, a maximum value thereof was 0.13%, and a standard deviation was 0.024.

The use of the reference luminance can absorb device-to-device differences and reduce variations in the area ratio of debris between the devices, allowing any device to make an accurate debris determination.

In Comparative Example 2, on the other hand, a minimum value was 0%, a maximum value was 0.17%, and a standard deviation was 0.063, as shown in FIG. 13.

The device-to-device differences led to large differences in the calculated area ratios of debris, making an accurate debris determination difficult.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A debris determination method of determining, using an image obtained by an appearance inspection device, debris that occurs around a hard laser mark on a backside of a wafer after the hard laser mark is formed on the backside or after the backside is polished after formation of the hard laser mark, comprising:
- a step A of calculating reference luminance from a grayscale image obtained by the appearance inspection device;
- a step B of extracting a hard laser mark-printed region including the hard laser mark from the grayscale image;
- a step C of excluding a dot portion of the hard laser mark from the extracted hard laser mark-printed region;
- a step D of extracting, with reference to the reference luminance, a region of the debris from the hard laser mark-printed region from which the dot portion of the hard laser mark has been excluded; and
- a step E of determining presence or absence of the debris in the hard laser mark-printed region based on the extracted region of the debris.

2. The debris determination method according to claim 1, wherein in the step A,
- an average value of luminance of a portion in the grayscale image where the hard laser mark is not imprinted is calculated as the reference luminance.

3. The debris determination method according to claim 1, wherein in the step B,
- a threshold (identification frame) of pixel luminance is set in advance that enables detection of a white identification frame appearing to surround the hard laser mark-printed region in the grayscale image,
- a region at or above the threshold (identification frame) is determined and detected as the white identification frame, and
- a region surrounded by the detected white identification frame is extracted as the hard laser mark-printed region.

4. The debris determination method according to claim 2, wherein in the step B,
- a threshold (identification frame) of pixel luminance is set in advance that enables detection of a white identification frame appearing to surround the hard laser mark-printed region in the grayscale image,
- a region at or above the threshold (identification frame) is determined and detected as the white identification frame, and
- a region surrounded by the detected white identification frame is extracted as the hard laser mark-printed region.

5. The debris determination method according to claim 1, wherein in the step C,
- from a relationship between a dot region that constitutes the hard laser mark and pixel luminance of the dot region, a threshold (dot region) of pixel luminance is set in advance that enables extraction of only the dot region,
- a region with pixel luminance at or below the threshold (dot region) is determined and extracted as the dot region, and
- a region expanded by one or more pixels around a periphery of the extracted dot region is excluded as the dot portion.

6. The debris determination method according to claim 2, wherein in the step C, from a relationship between a dot region that constitutes the hard laser mark and pixel luminance of the dot region, a threshold (dot region) of pixel luminance is set in advance that enables extraction of only the dot region, a region with pixel luminance at or below the threshold (dot region) is determined and extracted as the dot region, and a region expanded by one or more pixels around a periphery of the extracted dot region is excluded as the dot portion.

7. The debris determination method according to claim 3, wherein in the step C, from a relationship between a dot region that constitutes the hard laser mark and pixel luminance of the dot region, a threshold (dot region) of pixel luminance is set in advance that enables extraction of only the dot region, a region with pixel luminance at or below the threshold (dot region) is determined and extracted as the dot region, and a region expanded by one or more pixels around a periphery of the extracted dot region is excluded as the dot portion.

8. The debris determination method according to claim 4, wherein in the step C, from a relationship between a dot region that constitutes the hard laser mark and pixel luminance of the dot region, a threshold (dot region) of pixel luminance is set in advance that enables extraction of only the dot region, a region with pixel luminance at or below the threshold (dot region) is determined and extracted as the dot region, and a region expanded by one or more pixels around a periphery of the extracted dot region is excluded as the dot portion.

9. The debris determination method according to claim 1, wherein in the step D, a relationship between a higher luminance debris which is debris with higher luminance than the reference luminance and pixel luminance of the higher-luminance debris and a relationship between a lower-luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

10. The debris determination method according to claim 2, wherein in the step D, a relationship between a higher-luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

11. The debris determination method according to claim 3, wherein in the step D, a relationship between a higher-luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

12. The debris determination method according to claim 4, wherein in the step D, a relationship between a higher-luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

13. The debris determination method according to claim 5, wherein in the step D, a relationship between a higher luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

14. The debris determination method according to claim 6, wherein in the step D, a relationship between a higher-luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

15. The debris determination method according to claim 7, wherein in the step D, a relationship between a higher-luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

16. The debris determination method according to claim 8, wherein in the step D, a relationship between a higher-luminance debris which is debris with higher luminance than the reference luminance and pixel luminance of the higher-luminance debris and a relationship between a lower luminance debris which is debris with lower luminance than the reference luminance and pixel luminance of the lower-luminance debris are obtained in advance, and a threshold (higher-luminance debris) of pixel luminance that enables extraction of the higher-luminance debris with reference to the reference luminance and a threshold (lower-luminance debris) of pixel luminance that enables extraction of the lower-luminance debris with reference to the reference luminance are set in advance, and a region with pixel luminance at or above the threshold (higher-luminance debris) and a region with pixel luminance at or below the threshold (lower-luminance debris) are determined and extracted as the region of debris.

17. The debris determination method according to claim 1, wherein in the step E, a relationship between an area ratio of the region of debris in the hard laser mark-printed region and quality defects caused by debris in a device manufacturing process is obtained in advance, and a threshold (presence of debris) of the area ratio of the region of debris at which the quality defects caused by debris occur is set in advance, the area ratio of the region of debris in the hard laser mark-printed region is obtained from a number of pixels in the extracted region of debris, and when the area ratio of the region of debris which is obtained from the number of pixels in the extracted region of debris is at or above the threshold (presence of debris), it is determined that debris is present.

* * * * *